United States Patent [19]

Bodnar

[11] Patent Number: 4,546,954
[45] Date of Patent: Oct. 15, 1985

[54] ENGINE AIR CUT-OFF VALVE

[76] Inventor: Ronald J. Bodnar, 1448 Knottwood Rd. East, Edmonton, Alberta, Canada, T6K 2J9

[21] Appl. No.: 648,605

[22] Filed: Sep. 7, 1984

Related U.S. Application Data

[63] Continuation of Ser. No. 390,292, Jun. 21, 1982, abandoned.

[51] Int. Cl.⁴ .............................................. F16K 25/00
[52] U.S. Cl. ...................................... 251/88; 251/113; 251/175; 251/302
[58] Field of Search ................. 271/88, 301, 302, 303, 271/110, 113

[56] References Cited

U.S. PATENT DOCUMENTS

| | | | |
|---|---|---|---|
| 1,609,565 | 12/1926 | McFarlan | 251/301 |
| 3,279,494 | 10/1966 | Nixon | 251/302 X |
| 4,381,100 | 4/1983 | Schoenberg | 251/302 X |

Primary Examiner—Harold W. Weakley
Attorney, Agent, or Firm—Ernest Peter Johnson

[57] ABSTRACT

The valve comprises a two-piece housing consisting of a body and a flat cover. The body is milled out to define a working chamber. A port extends through the body wall to communicate with the chamber; a second port extends through the cover wall. The two ports are aligned at one side of the chamber, so that the remainder of the chamber provides a storage cavity. A gate valve comprising a stem and gate is wholly contained within the chamber. The base of the stem is pivotally connected on a shaft journalled in the housing, so that the gate may be rotated or swung along an arc from the storage cavity to a blocking position across the ports. Disengageable means are provided to normally lock the gate valve in the stored position. Means are also provided to bias the gate valve to the blocking position when the locking means are disengaged. The assembly is flat and compact and is particularly adapted to fit in the crowded confines of an engine.

2 Claims, 8 Drawing Figures

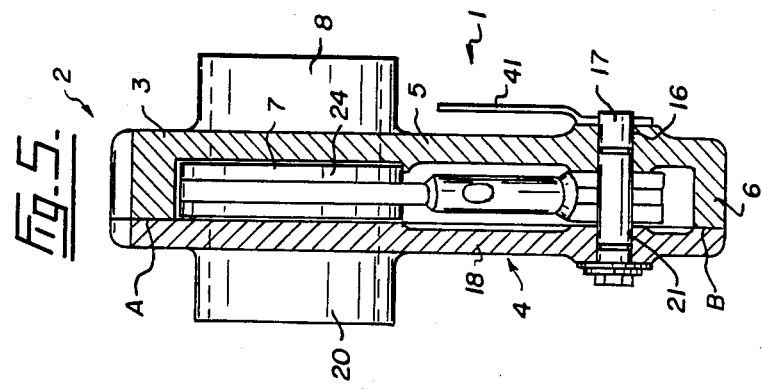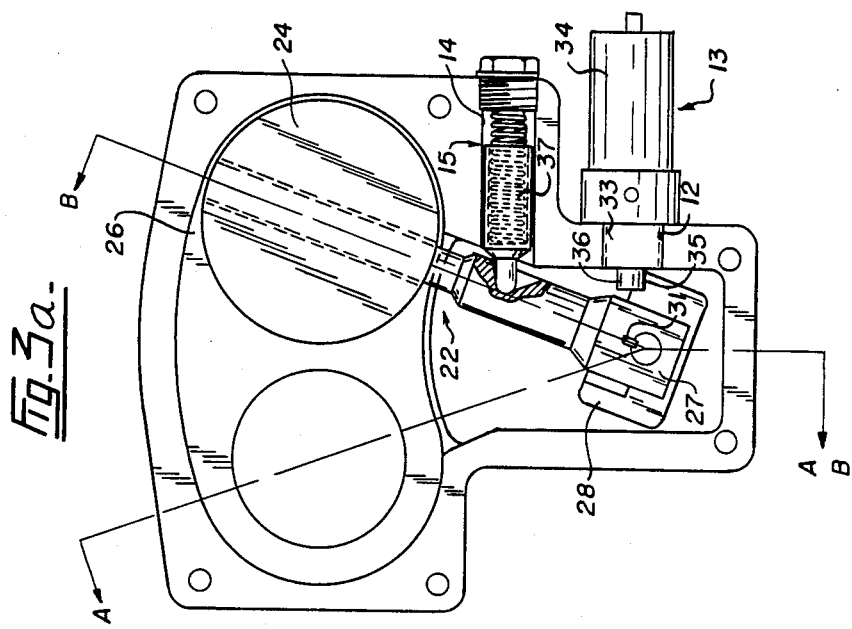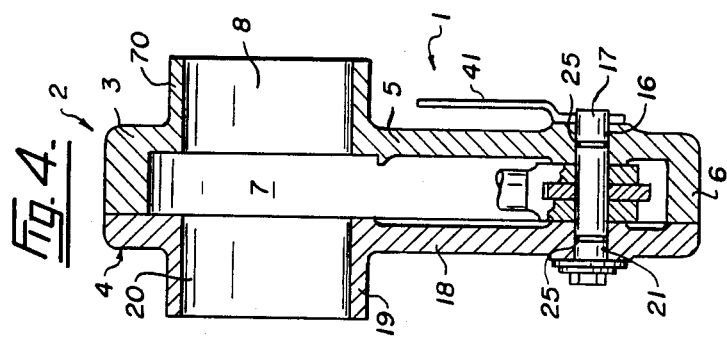

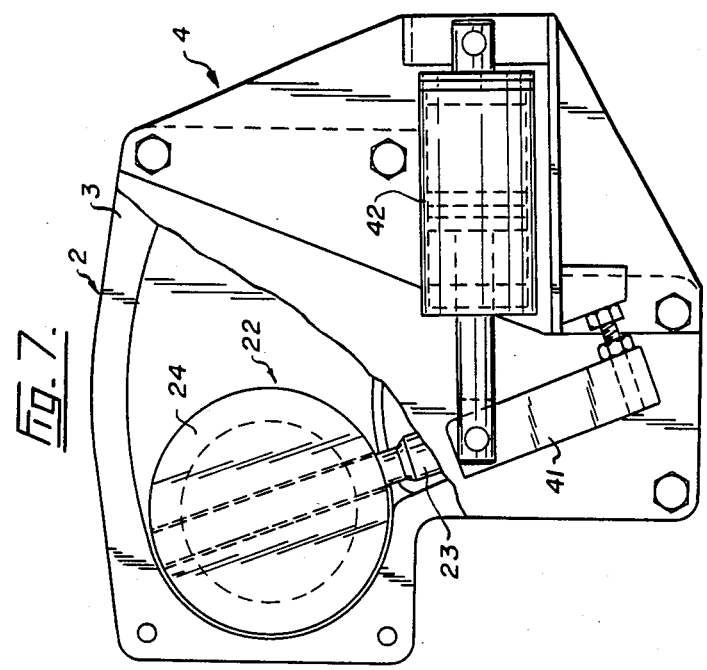
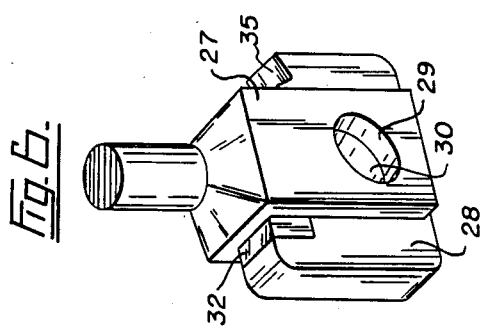
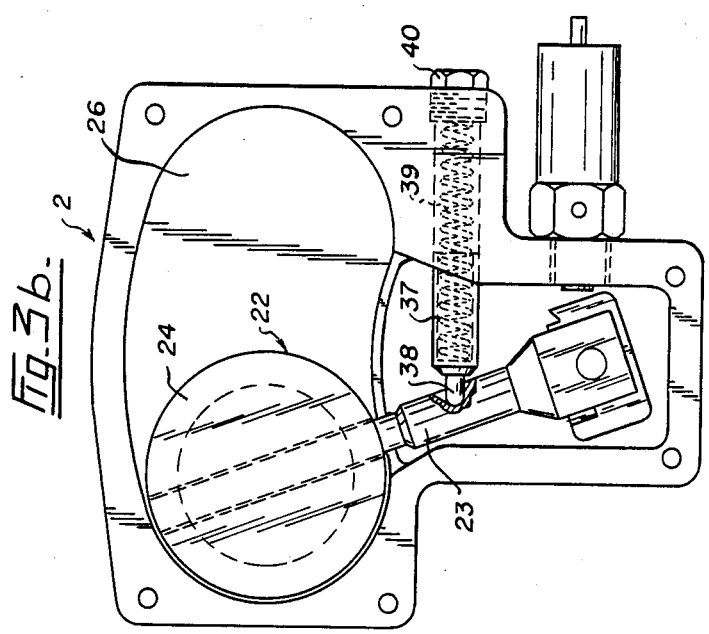

ENGINE AIR CUT-OFF VALVE

This application is a continuation of application Ser. No. 390,292, filed June 21, 1982 now abandoned.

BACKGROUND OF THE INVENTION

1. Field of the Invention

This invention relates to an air cut-off valve which finds application as a safety device for controlling the air intake of an engine.

2. Prior Art

An air cut-off valve is commonly employed to close the air intake line extending between the turbocharger and air intake manifold of a diesel or gas-fuelled engine. The valve is used to withhold air supply from the engine, in the event that it is sensed that hydrocarbons are entrained in the air. These valves are particularly needed, for example, in connection with the engines of a drilling rig, where there is a significant possibility that gas will escape from the well and cause the engines to continue running, even though the fuel supply has been closed off. The continued operation of the engines carries a high risk of causing the escaping gas to ignite.

The cut-off valve heretofore most widely used in this service in North America is disclosed in Canadian Pat. No. 587,457, issued to Oakes. This valve is described in some detail below because the present invention uses some of its concepts, but incorporates modifications with a view to overcoming some of its shortcomings.

The Oakes valve comprises a hollow, box-like, sectional housing having a greater length than width. This housing is formed using two hollowed-out halves or sections which are bolted together. An air inlet port extends through the upper end of the transverse upstream wall of one such section and an outlet port extends through the upper end of the downstream wall of the other section. The ports are linearly aligned. In use, the valve is inserted in the air line so that the ports and the chamber internal of the housing form part of the air flow path. The long housing extends well below the air line, for a purpose to be explained.

A valve member, comprising a stem and a gate carried thereby, is arranged to reciprocate longitudinally within the chamber. This valve member is movable between stored and operative positions. In the stored position, the gate is disposed in a storage cavity defined by the lower end of the chamber, out of the air flow path; the stem extends out the bottom of the housing. In the operative position, the gate is disposed across the ports, seals against the housing, and effectively blocks the air flow path.

A spring is provided to bias the stem and its attached gate from the stored position to the operative position. This spring is positioned around and along the stem and extends between the bottom wall of the housing and a shoulder on the valve member. When the valve member is locked by suitable locking means in the stored position, the spring is compressed. When the locking means is released, the spring expands and biases the valve member to the operative or blocking position.

The aforementioned releasable locking means comprises a lock-out cylinder which has a spring-loaded shaft that engages a recess in the valve stem, to lock the stem in the stored position.

In summary, the Oakes valve involves in concept the following features:

(1) a gate positioned in a sealed hollow, in-line housing, which gate is movable between a stored position, in which it is locked in a storage cavity formed by the housing out of the air flow path, and an operative position, in which it blocks and seals the air flow path; and (2) a steam which carries the gate and biases it between the positions, said stem cooperating with mover means and locking means to provide the motion needed at the appropriate time.

The present invention also incorporates the aforementioned features. However, in applicant's view, the Oakes valve, while successful, has some shortcomings. The present invention involves significant structural and conceptual changes which have alleviated or done away with these problems.

One such problem associated with the Oakes valve is its size. It has a thickness of about 2-$\frac{1}{2}$" and a downwardly extending length of about 17", measured from the centreline of the air line. Since there is a scarcity of available space within the confines of an engine assembly, this bulkiness leads to problems of installation and accommodation.

The valve is necessarily thick in part because the coil spring is mounted around the stem, which arrangement follows from the use of a longitudinal drive.

That the valve is necessarily long follows from the incorporation of longitudinal movement of the gate and stem between longitudinally aligned storage and operative positions.

Another problem has to do with sealing of the stem. It protrudes out of the housing through an opening formed at the parting line of the housing sections. Tapping in at the parting line is necessary in order to be able to install a seal in a facile and inexpensive manner. However, it is difficult to so accurately machine the semi-circular openings in the housing sections that they are perfect matches, so that the seal, when mounted in the surfaces of the openings, fits properly and provides an air-tight seal between the stem and the housing.

Still another problem has to do with the positioning of the lock-out cylinder. In the Oakes valve, it is positioned in a plane perpendicular to the parting plane of the housing. This is done because it is easier to tap into the transverse wall of the housing than to tap in at the parting line. This arrangement further interferes with the objective of developing compactness as an attribute of the valve.

With this background in mind, it will be understood that there is a need for an air cut-off valve which is characterized by compactness, ease of sealing, and ease of manufacture.

SUMMARY OF THE INVENTION

In accordance with the present invention, an air cut-off valve is provided in which the valve member swings through an arc about a transverse pivot member, when moving between the stored and operative positions.

One result of this arrangement is that the pivot member may be journalled in the side walls of the valve and sealed in an effective and simple manner.

Another result is that the length of valve is relatively short, as it does not have to accommodate a stem which moves between longitudinally aligned positions.

The arrangement further lends itself to combination with a side drive. That is, the biasing means, such as a spring, may be disposed in the main plane of the housing to act against the stem from the side. The increase in valve thickness, which arises from concentrically positioning the stem, spring and gate, is thereby avoided.

Still another advantage of the arrangement is that it lends itself to using a hollowed out body and flat cover to form the housing. With such a housing, the lock-out means may be tapped into the side wall of the body. As a result, the lock-out means extends in the main plane of the housing, thereby ensuring compactness.

By making these modifications, a cut-off valve is provided which has a thickness of about 1-½" and a length from the air line of about 10". Also, sealing of the valve is improved.

Broadly stated, the invention is an air cut-off valve comprising: a housing formed by a hollow body and a flat cover secured thereto, said housing defining an internal chamber and having upstream and downstream walls which form inlet and outlet ports respectively, said housing having gate and stem ends and being adapted to be connected in an air supply line whereby the ports and chamber form part of the air flow path, said ports being positioned at one side of the chamber at the gate end, whereby the other side of the gate provides a storage cavity; a valve assembly comprising a stem having a gate mounted thereon at one end thereof, said gate being located in the gate end of the chamber, said stem extending into the stem end of the chamber; a pivot member positioned in the stem end of the chamber; said stem being pivotally mounted on the pivot member so that the gate is adapted to move about said pivot member along an arc from the stored position in the storage cavity to an operative position in which it blocks one of the ports and seals against the wall forming such port; said valve assembly being wholly disposed within the chamber; lock-out means, associated with the stem end of the housing and being positioned so that its main axis extends substantially parallel to the main plane of the housing, for mechanically locking the stem in the stored position until disengaged, said lock-out means being manually disengageable to release the stem when required; and mechanical drive means, also associated with the stem end of the housing and being positioned so that its main axis extends substantially parallel to the main plane of the housing, for normally urging the stem to the operative position, when the lock-out means is disengaged to shift the gate from the stored position to the operative position.

DESCRIPTION OF THE DRAWINGS

FIG. 3a is a top view, partly in section, showing the body with the valve member in the stored position, the drive means retracted, and the lock-out means engaged;

FIG. 3b is identical to FIG. 3a except that the valve member is in the operative position, the drive means is extended, and the lock-out means is disengaged;

FIG. 4 is a side sectional view taken along the lines A—A of FIG. 3b;

FIG. 5 is a side sectional view taken along the line B—B of FIG. 3a;

FIG. 6 is a perspective view of a component, the compensator plate, used in the assembly; and FIG. 7 is a top view, partly in section, similar to FIG. 3a but showing a cylinder as the drive means and a stop screw to limit the extent of valve member rotation.

DESCRIPTION OF THE PREFERRED EMBODIMENT

The Housing

Figure 2:
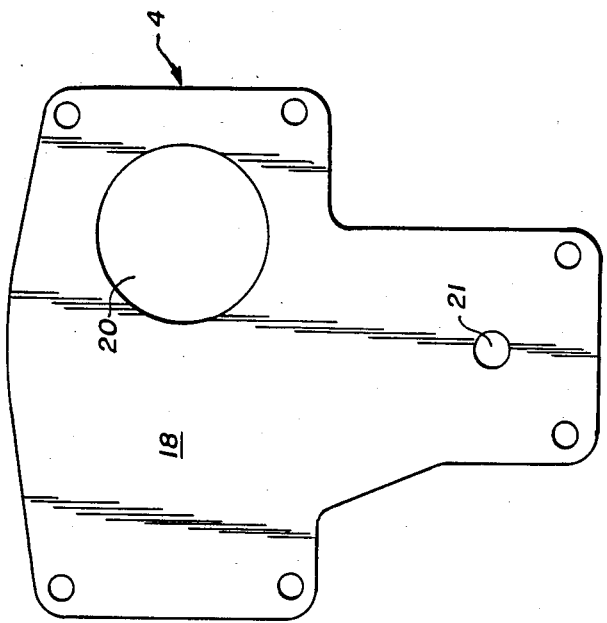
FIG. 2 is a bottom plan view of the cover of the housing.
Figure 1:
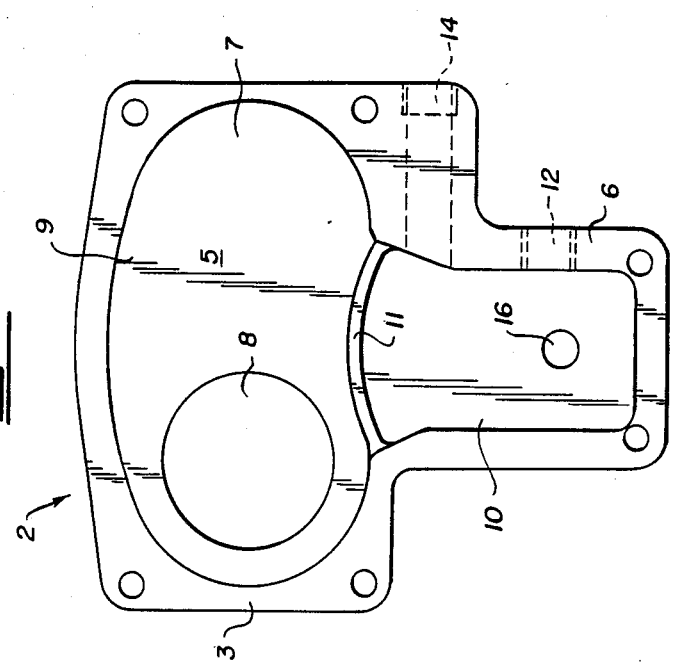
FIG. 1 is a top plan view of the body of the housing.

The cut-off valve 1 comprises a flat housing 2, which consists of a hollow body 3 and a flat cover 4 bolted together. The housing 2 is T-shaped in configuration, when viewed in plan.

The body 3 is formed by a main or transverse wall 5, termed "the upstream wall", and a side wall 6. An internal T-shaped recess or chamber 7 is defined by the walls 5,6.

The upstream wall 5 comprises a collar 70, which defines an inlet port 8 extending through said wall and communicating with one side of the internal chamber 7. The collar 70 is adapted to connect with the air supply line (not shown) of the motor.

The inner surface of the upstream wall 5 is stepped slightly, to provide an elevated upper surface 9 and a recessed lower surface 10, said surfaces being divided by a shoulder 11.

A first bore 12 extends through the side wall 6 at its lower end, to accommodate a lock-out means 13.

A second bore 14 similarly extends through the side wall 6 above the first bore 12, to accommodate a drive means 15.

A third bore 16 extends through the lower end of the upstream wall 5, to accommodate a pivot shaft 17.

Turning now to the cover 4, it is generally parallel to the main wall 5 and conforms in shape to the outline of the body 3. Both the body 3 and cover 4 have machined contact surfaces which sealably engage at A and B to prevent air leakage.

The cover 4 comprises a transverse wall 18, termed 'the downstream wall'. The cover 4 further comprises a collar 19, which defines an outlet port 20. The outlet port 20 is aligned with the inlet port 8 and provides communication through the downstream wall 18 with one side of the internal chamber 7. The collar 19 is adapted to connect with the air supply line.

The inlet port 8, internal chamber 7 and outlet port 20 are operative, when the valve 1 is installed in an air supply line, to form part of the air flow path.

A fourth bore 21 extends through the lower end of the downstream wall 18 and is aligned with the third bore 16; this fourth bore 21 functions to accommodate the pivot shaft 17.

The Blocking and Sealing Means

A gate valve 22 is pivotally mounted for movement within the chamber 7. The gate valve 22 functions to block and seal one of the ports 8, 20, to interrupt the air flow.

The gate valve 22 comprises a biasing element or stem 23 and a sealing element or gate 24 connected with the upper end of said stem. The stem 23 and gate 24 assembly is wholly contained within the chamber 7.

The vertical stem 23 is pivotally mounted at its lower end on a horizontal pivot member or shaft 17 extending transverse to the stem. The pivot shaft 17 is journalled in the third and fourth bores 16, 21. O-rings 25 seal the pivot shaft 17 against the bounding surfaces of the bores 16, 21, to prevent air leakage.

The stem 23 may be pivoted to carry the gate 24 along an arc between a stored position, shown in FIG. 3a, in the storage cavity portion 26 of the chamber 7, and an operative position, shown in FIG. 3b, wherein it functions to block one or both of the ports 8,20.

The circular gate 24 is formed with a central bore in which the upper end of the stem 23 is received. The gate 24 is free-floating on the stem 23—that is, it has a loose tolerance fit on the stem so that it can rotate about the stem's main axis and can tilt at a slight angle relative to said axis. In addition, the gate 24 is formed of resilient elastomer material. As a result of providing the free-floating capability and forming the gate of resilient material, a particularly effective seal may be achieved.

A preferred means for mounting the stem 23 on the pivot shaft 17 is provided. More particularly, the stem 23 has a clevis 27 at its lower end. An L-shaped compensator plate 28 extends through the clevis 27. The compensator plate 28 and clevis 27 define aligned bores 29, 30, through which the pivot shaft 17 extends. A key 31 extends through suitable bores (not shown) in the shaft 17, plate 28, and clevis 27, to hold them together. The plate 28 is formed with a resilient shoulder member 32, to bear against the clevis 27 when it moves to the operative position.

Locking Means

An elongate mechanical lock-out cylinder 13, of conventional design, is positioned in the first bore 12 of the housing 2, to engage the compensator plate 28 and restrain the stem 23 keyed thereto in the stored position. The cylinder 13 is separate from the stem 23 but adapted to act thereagainst. More particularly, the cylinder 13 comprises a piston 33, which is normally outwardly urged by a spring (not shown) mounted within the cylinder barrel 34.

The piston 33 engages a notch 35 formed in the compensator plate 28 to lock the latter against rotation. The end 36 of the piston 33, remote from the compensator plate 28, extends out the end of the barrel 34. This piston end 36 may be manually pulled with pliers to disengage the piston 33 from the notch 35 and thereby release the stem 23.

Drive Means

An elongate mechanical plunger 37 is positioned within the second bore 14 of the housing 2. The outer end 38 of this plunger 37 contacts the stem 23. A spring 39 is positioned within the bore 14 and acts to normally urge the plunger 37 outwardly against the stem 23. A plug 40 is screwed into the outer end of the bore 14, to provide a footing for the spring 39.

Upon disengaging the lock-out piston 33 and releasing the plate 28, the spring 39 extends and drives the stem 23, to cause it to rotate about the pivot shaft 17 between the stored and operative positions.

Operation

When installed, the cut-off valve 1 is positioned in the air supply line with its upstream and downstream walls 5, 18 transverse to the axis of the line. The ports 8, 20 communicate with the air line. The ports 8,20 and chamber 7 form part of the air flow path.

The valve components are normally in the locked, stored position. That is, the gate valve 22 is in the stored position shown in FIG. 3a. The lock-out piston 33 is extended and its end 36 engages the notch 35 of the compensator plate 28. The plunger 37 is pressing against the stem 23, but it has compressed the drive spring 39. The gate 24 is in the storage cavity portion 26 of the chamber 7 and the flow path through the valve 1 is open.

When the piston end 36 of the lock-out cylinder 13 is pulled to the right, the piston 33 is retracted from the plate notch 35 and the stem 23 is then free to rotate. The drive spring 39 expands and the plunger 37 biases or rotates the stem 23 to the left about its pivot shaft 17. The gate 24 is thereby moved along an arc between the stored position and the operative position shown in FIG. 3b. The engine vacuum sucks the gate 24 firmly against the downstream wall 18 to block and seal the outlet port 20.

To reset the gate valve 22, the handle 41, secured to the pivot shaft 17, is pulled to rotate the gate valve back to the locked, stored position.

Alternative

In a variation of the invention, shown in FIG. 7, the locking and driving functions may be combined in a single component, for example an air cylinder 42 pivotally secured to the stem 23.

Advantages

The specific embodiment of the invention shown in the drawings is characterized by the following advantages:
 (1) the valve is compact; and
 (2) the pivot shaft is easily sealed.

Scope

The best mode of the invention has been shown and described in the disclosure. However, this is a specific embodiment of the invention. The scope of the invention is defined in the following claims.

The embodiments of the invention in which an exclusive property or privilege is claimed are defined as follows:

1. An air cut-off valve comprising:
 a flat housing formed by a hollow body, having a main wall and an upstanding side wall extending along the entire perimeter of the main wall, and a flat cover secured thereto and generally parallel to the main wall, said housing defining an internal chamber and having upstream and downstream walls which are opposed and form inlet and outlet ports respectively, said housing having gate and stem ends and being adapted to be connected in an air supply line whereby the ports and chamber form part of the air flow path, said ports being positioned at one side of the chamber at the gate end, whereby the other side of the chamber provides a storage cavity;
 a valve assembly comprising a stem having a gate mounted thereon at one end thereof, said gate being located in the gate end of the chamber, said stem extending into the stem end of the chamber;
 a pivot member positioned in the stem end of the chamber and extending transverse to the axis of the stem, the pivot member being journalled in the upstream and downstream walls of the housing;
 said stem being pivotally mounted on the pivot member so that the gate is adapted to move about said pivot member along an arc from the stored position in the storage cavity to an operative position in which it blocks one of the ports and seals against the wall forming such port;
 said gate and stem being wholly disposed within the chamber;

elongate mechanical lock-out means, associated with the stem end of the housing and being positioned so that its main axis extends substantially parallel to the main plane of the housing, for mechanically locking the stem in the stored position until disengaged, said lock-out means being manually disengageable to release the stem when required;

and elongate mechanical drive means, separate from the stem but adapted to act thereagainst, said drive means being also associated with the stem end of the housing and being positioned so that its main axis extends substantially parallel to the main plane of the housing, for normally urging the stem to the operative position, when the lock-out means is disengaged, to shift the gate from the stored position to the operative position.

2. The valve as set forth in claim 1 wherein:

the gate has a loose fit on the stem so that it is free-floating, said gate having an elastomer sealing surface, whereby, when the valve is in use in connection with an engine, the vacuum created by the engine is operative to pull the gate into intimate sealing relationship with the housing in the operative position.

* * * * *